US012705836B2

(12) United States Patent
Jiao et al.

(10) Patent No.: US 12,705,836 B2
(45) Date of Patent: Aug. 11, 2026

(54) METHOD, APPARATUS, ELECTRONIC DEVICE AND STORAGE MEDIUM FOR RECONSTRUCTING 3D IMAGES

(71) Applicant: Beijing Bytedance Network Technology Co., Ltd., Beijing (CN)

(72) Inventors: Shaohui Jiao, Beijing (CN); Yue Wang, Beijing (CN); Dehao Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 222 days.

(21) Appl. No.: 18/573,125

(22) PCT Filed: Sep. 14, 2022

(86) PCT No.: PCT/CN2022/118622
§ 371 (c)(1),
(2) Date: Dec. 21, 2023

(87) PCT Pub. No.: WO2023/071574
PCT Pub. Date: May 4, 2023

(65) Prior Publication Data

US 2024/0296626 A1 Sep. 5, 2024

(30) Foreign Application Priority Data

Oct. 25, 2021 (CN) ......................... 202111243153.5

(51) Int. Cl.
*G06T 17/20* (2006.01)
*G06T 7/593* (2017.01)
(Continued)

(52) U.S. Cl.
CPC .............. *G06T 17/20* (2013.01); *G06T 7/593* (2017.01); *G06T 15/10* (2013.01); *H04N 19/597* (2014.11);
(Continued)

(58) Field of Classification Search
CPC .................. H04N 19/597; G06T 15/10; G06T 2207/10028; G06T 7/593;
(Continued)

(56) References Cited

U.S. PATENT DOCUMENTS 6,377,257 B1 4/2002 Borrel et al.
8,988,317 B1 * 3/2015 Liang ...................... G06T 7/557 345/32
(Continued)

FOREIGN PATENT DOCUMENTS

CN 103914582 A 7/2014
CN 104427325 A 3/2015
(Continued)

OTHER PUBLICATIONS

International Search Report and Written Opinion, International Patent Application No. PCT/CN2022/118622, Nov. 18, 2022, with English translation of Search Report (9 pages).
(Continued)

*Primary Examiner* — Phi Hoang
(74) *Attorney, Agent, or Firm* — Astute IP Law Group

(57) ABSTRACT

This disclosure discloses a method, an apparatus, an electronic device, and a storage medium for reconstructing a 3D image. The method of reconstructing a 3D image includes: receiving depth video streams of at least two camera perspectives of a same scene; determining a 3D video model corresponding to the depth video streams of the at least two camera perspectives; performing a light field rendering on the 3D video model based on an obtained interaction param-
(Continued)

eter to obtain a plurality of target light field rendering views; and sending the plurality of target light field rendering views to a display end to construct a 3D image corresponding to the depth video streams at the display end.

20 Claims, 4 Drawing Sheets

(51) Int. Cl.
*G06T 15/10* (2011.01)
*H04N 19/597* (2014.01)

(52) U.S. Cl.
CPC ............... *G06T 2207/10021* (2013.01); *G06T 2207/10028* (2013.01)

(58) Field of Classification Search
CPC ........... G06T 2207/10021; G06T 17/20; G06T 15/005; G06T 19/20; G06T 17/00
See application file for complete search history.

(56) References Cited

U.S. PATENT DOCUMENTS

| | | | | |
|---|---|---|---|---|
| 2011/0128412 | A1* | 6/2011 | Milnes | H04N 13/211 348/222.1 |
| 2017/0034505 | A1 | 2/2017 | Fusama | |
| 2017/0345213 | A1* | 11/2017 | Ernst | G06T 15/20 |
| 2018/0184066 | A1* | 6/2018 | Salahieh | H04N 13/327 |
| 2020/0380229 | A1* | 12/2020 | Peruch | G06K 7/1447 |
| 2021/0389724 | A1* | 12/2021 | Cossairt | G03H 1/2286 |
| 2022/0295042 | A1* | 9/2022 | Lapstun | H04N 13/307 |
| 2022/0351456 | A1* | 11/2022 | Harviainen | G06T 15/20 |
| 2023/0177400 | A1* | 6/2023 | Dal Mutto | G06N 3/04 382/165 |

FOREIGN PATENT DOCUMENTS

| | | | |
|---|---|---|---|
| CN | 109978931 | A | 7/2019 |
| CN | 110998669 | A | 4/2020 |
| CN | 111679566 | A | 9/2020 |
| CN | 111937040 | A | 11/2020 |
| CN | 112087616 | A | 12/2020 |
| CN | 112087620 | A | 12/2020 |
| CN | 112738534 | A | 4/2021 |
| CN | 112884877 | A | 6/2021 |
| CN | 112927273 | A | 6/2021 |
| CN | 113192185 | A | 7/2021 |
| CN | 113436348 | A | 9/2021 |
| CN | 113989432 | A | 1/2022 |

OTHER PUBLICATIONS

Office Action issued in Chinese Patent Application No. 202111243153.5, Jul. 6, 2023, with machine translation (22 pages).

Cheng L, et al., "3D dynamic object reconstruction technique based on light field rendering", Journal of the Graduate School of the Chinese Academy of Science, 2009, vol. 26 (6) pp. 781-788, with machine translation.

* cited by examiner

METHOD, APPARATUS, ELECTRONIC DEVICE AND STORAGE MEDIUM FOR RECONSTRUCTING 3D IMAGES

This application claims priority to the Chinese Patent Application No. 202111243153.5 filed to the Chinese Patent Office on Oct. 25, 2021, which is hereby incorporated by reference in its entirety.

FIELD

The present disclosure relates to the field of computer technology, for example, to a method, an apparatus, an electronic device, and a storage medium for reconstructing three-dimensional (3D) images.

BACKGROUND

A solution of real-time holographic dialogue has always been a goal pursued by academia and industry. In order to achieve holographic dialogue, real-time compression may be performed on the modeled 3D image, and the compressed 3D video image may be sent to the display end. Upon receiving the 3D video images, the display end decompresses and displays the same.

At this time, due to the need to compress the video picture, some information may inevitably be missing. At the same time, due to the large amount of data, it needs to rely on high-speed network transmission such as 5th Generation Mobile Communication Technology (5G)/fiber optic, which has a problem of poor universality.

SUMMARY

The present disclosure provides a method, an apparatus, an electronic device, and a storage medium for reconstructing a 3D image, which realizes real-time holographic communication with fewer cameras and enhances the universality of the scheme while ensuring view quality.

The present disclosure provides a method of reconstructing a 3D image, comprising:

- receiving depth video streams of at least two camera perspectives of a same scene;
- determining a 3D video model corresponding to the depth video streams of the at least two camera perspectives;
- performing a light field rendering on the 3D video model based on an obtained interaction parameter to obtain a plurality of target light field rendering views; and
- sending the plurality of target light field rendering views to a display end to construct a 3D image corresponding to the depth video streams at the display end.

The present disclosure further provides an apparatus for reconstructing a 3D image, comprising:

- a depth video stream receiving module configured to receive depth video streams of at least two camera perspectives of a same scene;
- a 3D video model determining module configured to determine a 3D video model corresponding to the depth video streams of the at least two camera perspectives;
- a target light field rendering view determining module configured to perform a light field rendering on the 3D video model based on an obtained interaction parameter to obtain a plurality of target light field rendering views; and
- a sending module configured to send the plurality of target light field rendering views to a display end to construct a 3D image corresponding to the depth video streams at the display end.

The present disclosure further provides an electronic device, comprising:

- one or more processors;
- a storage device configured to store at least one program;
- the at least one program, when executed by the at least one processor, causes the at least one processor to implement the method of reconstructing a 3D image mentioned above.

The present disclosure also provides a storage medium containing computer-executable instructions, the computer-executable instructions, when executed by a computer processor, perform the method of reconstructing a 3D image mentioned above.

DETAILED DESCRIPTION

Figure 1:
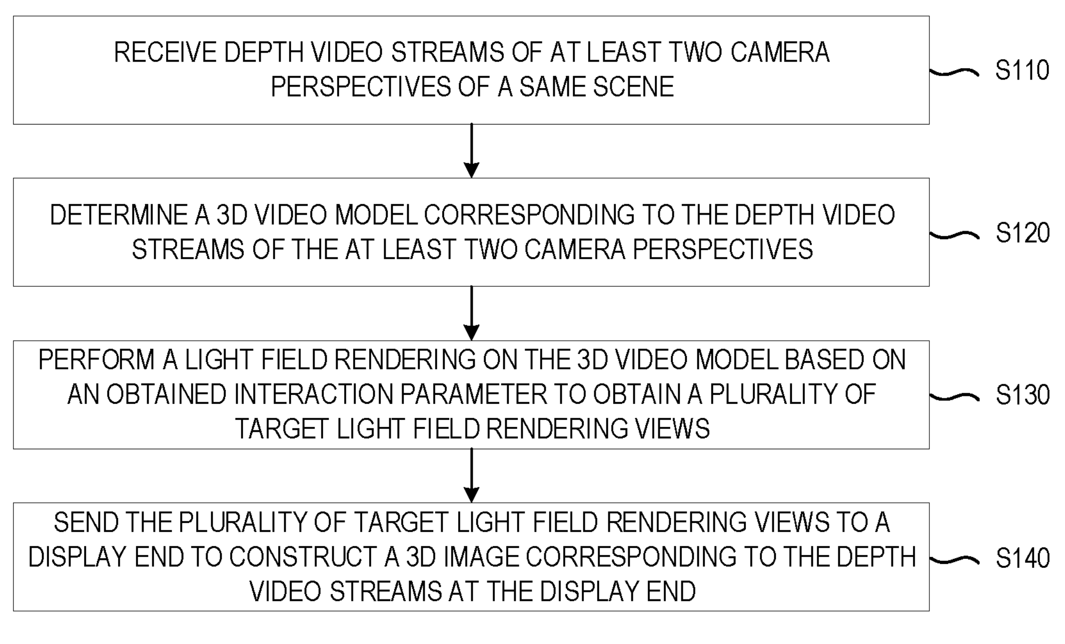
FIG. 1 is a flowchart of a method of reconstructing a 3D image provided in a first embodiment of the present disclosure.

The following will describe the embodiments of the present disclosure with reference to the accompanying drawings. Although some embodiments of the present disclosure are shown in the drawings, the present disclosure can be implemented in various forms, and these embodiments are provided for understanding the present disclosure. The drawings and embodiments of the present disclosure are for illustrative purposes only.

The multiple steps described in the method implementation of the present disclosure may be executed in different orders and/or in parallel. In addition, the method implementation may include additional steps and/or omit a shown step. The scope of the present disclosure is not limited in this regard.

The term "comprising" and its variations as used herein are open to comprise, i.e. "comprising but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The concepts of "first" and "second" mentioned in the present disclosure are only used to distinguish different apparatuses, modules, or units, and are not used to limit the order or interdependence of the functions performed by these apparatuses, modules, or units.

The modifications of "one" and "multiple" mentioned in the present disclosure are illustrative and not restrictive. Those skilled in the art should understand that unless otherwise indicated in the context, they should be understood as "one or more".

Embodiment One

FIG. 1 is a schematic flow diagram of a method of reconstructing a 3D image according to Embodiment one of the present disclosure, and the present embodiment is applicable to the case of real-time holographic communication with fewer cameras. The method may be performed by an apparatus for reconstructing a 3D image, and the apparatus may be implemented in the form of software and/or hardware. The hardware may be an electronic device, such as a mobile terminal, a Personal Computer (PC) end or a server.

As shown in FIG. 1, the method of the present embodiment includes:

S110, receiving depth video streams of at least two camera perspectives of a same scene.

In the communication or interaction scheme based on streaming media, audio and video transmission between a plurality of ports is usually performed by a manner of streaming transmission, for example, a plurality of video frames are transmitted in a form of video streams. The depth video streams in this embodiment are video streams generated based on a plurality of images taken by at least two cameras. At the same time, in these images as transmission data, in addition to ordinary color images, at least a plurality of depth images need to be included. For these depth images, there are specific video frames corresponding to them in the depth video streams.

Color images are also known as Red-Green-Blue (RGB) images, and the RGB color space serves as the basis for composing color images. The three components of R, G, and B correspond to the colors of red, green, and blue channels, respectively. Their superposition determines the final display effect of the image. Depth images, also known as distance images, brightness values stored by pixels in the depth image are different from the brightness values stored by pixels in a grayscale image. Pixels in the depth image store depth values. For each pixel, the depth value represents the distance from the point to the camera. Through the depth values of a plurality of points, the distance between a target object in the image and the camera may be determined. The size of the depth value is only related to the distance factor and has nothing to do with factors such as environment, light, and direction. Therefore, the depth image can truly and accurately reflect geometric depth information of an object in an image, providing a data basis for the construction of a subsequent 3D image. For example, when a camera captures a corresponding depth image for an object, the computer may restore a 3D model corresponding to the object based on this image.

In this embodiment, in order to obtain the depth image that can reflect the geometric depth information of a scene while capturing the color image of the scene, at least two cameras need to be deployed for shooting. One camera is set to obtain the color image of the target scene, and a further camera is set to obtain the depth image of the target scene. At last, the depth video streams are integrated based on the images in data transmission channels corresponding to the two cameras. For example, the two cameras mentioned above may be aimed at the target scene at the same perspective for shooting, so that the depth video streams containing the color image and the depth image may be obtained.

In the actual application process, in order to improve the efficiency and accuracy of capturing image information, more cameras may be deployed from a plurality of perspectives for the target scene, and the deployment method may be selected according to a task requirement, which is not limited here in the embodiments of the present disclosure.

The depth video streams generated upon the cameras capturing scene information will be uploaded in a form of pushing streams. Pushing streams is a process of transmitting encapsulated content in the data acquisition stage to a server. Corresponding to the at least two cameras serving as the capture end, one end receiving the depth video streams may be a computing end, for example, a cloud server connected to the scene information capture end (such as the two cameras in the above example) based on the data transmission channel, and the computing end may perform a subsequent processing operation on the depth video streams after receiving them.

S120, determine a 3D video model corresponding to the depth video streams of the at least two camera perspectives.

In this embodiment, upon the computing end receiving the depth video streams, these data may be used as original data to construct a 3D model. The 3D model is a three-dimensional model corresponding to the target scene, which is a polygonal representation of the target scene (and objects within the scene) and may at least reflect the three-dimensional geometric structure of the scene (and objects within the scene). At the same time, a 3D model may be constructed based on each frame of the depth video streams, while the video streams contain a plurality of real-time frames of the target scene. Therefore, the constructed 3D model is also a dynamic 3D video model.

The computing end may determine the target scene and a geometric shape and the depth value of the object in the scene from each frame of the depth video streams based on Image-Based Modeling and Rendering (IBMR) related technologies, and create the 3D model corresponding to the depth video streams frame by frame based on 3D modeling software or tools. At last, integrate the model corresponding to each video frame in a timestamp order to obtain the dynamic 3D video model.

S130, perform a light field rendering on the 3D video model based on an obtained interaction parameter to obtain a plurality of target light field rendering views.

In this embodiment, the light field rendering operation performed on the 3D video model is a process of processing the 3D video model using light field imaging technology.

The light field is a four-dimensional concept generated by the propagation process of light in space, containing information that covers information such as light intensity, position, and direction. The light field includes two-dimensional position information and two-dimensional direction information carried by the light, which is a parameterized representation of a four-dimensional light radiation field containing both position and direction information in space. At the same time, the light field may also be used as the total of all light radiation functions in space.

Light field rendering is the technology that creates a two-dimensional image using information in the light field, and the obtained two-dimensional image is the light field rendering view in this embodiment. Compared with traditional imaging methods that only record the location information of the light passing through, three-dimensional information such as scene depth, target object geometric shape, and scene occlusion relationship will not be lost in the imaging process based on light field information. Although the light field rendering view generated based on the 3D model is a two-dimensional planar graph, the depth information of the target scene and the object in the scene is still stored in the image. After the image is processed by a specific algorithm or sent to a corresponding light field display device, the 3D image corresponding to the target scene and the object in the scene may still be constructed with high quality based on these images.

In this embodiment, when using light field rendering technology to process the 3D video model, it is also necessary to combine the interaction parameter obtained by the computing end. The interaction parameter refers to a parameter associated with a target user who finally views the 3D image, such as viewing location information and viewing angle information. The interaction parameter is used to characterize the perspective of the target user when viewing the 3D image. In a practical application process, the interaction parameter may be obtained from the device corresponding to the target user based on the data transmission channel.

For example, the angle coverage value for the 3D image of the device is obtained from the light field display of the target user as 45°, and this value is used as the interaction parameter. At the same time, the 3D video model constructed based on the depth video streams contains information of the plurality of perspectives of the target scene. Therefore, when the 3D image angle coverage value with the interaction parameter of 45° is determined, the direction that the camera is aimed at may be taken as a baseline, and the image within the range of perspectives of 22.5° on both sides of the baseline may be taken as the target image within the plane where the camera is located, and then ten target light field rendering views may be generated based on the part corresponding to the target image in the 3D video model.

The target light field rendering views may be multiple, which correspond to specific perspectives in the depth video streams and only reflect specific content in the target scene. At the same time, these content are also consistent with the content that the target user wants to view. On the one hand, the interaction parameter is not limited to the 3D image angle coverage value in the above example and may also be selected according to the actual situation of the user or the display device, which are not limited in the embodiments of the present disclosure. On the other hand, when the display end corresponding to the target user changes or the viewing perspective of the target user changes, the corresponding interaction parameter may also change, so that the target light field rendering view corresponding to the changed perspective is issued to the display end.

In this embodiment, the dynamic 3D video model corresponds to the plurality of image frames in the depth video streams, therefore for each image frame in the depth video streams, the plurality of target light field rendering views may be generated based on the 3D video model. In addition, identifiers such as timestamp may be applied to associate these views with the image frame, and these views are sent to the display end in real time according to the capture order of each image frame.

Corresponding target light field rendering views are constructed for the 3D video model by using the light field rendering technology, and there is no need to compress the 3D video model in the subsequent data transmission process, avoiding the problem of information loss caused by direct transmission of compressed model data.

S140, send the plurality of target light field rendering views to a display end to construct a 3D image corresponding to the depth video streams at the display end.

In this embodiment, the 3D image corresponding to the depth video streams can be obtained based on the plurality of generated target light field rendering views. The 3D image may be a 3D holographic image, and the 3D holographic image technology is the display technology that projects a three-dimensional stereoscopic image in a three-dimensional space, thereby reproducing an object in a specific space.

The target light field rendering views may be issued from the computing end to the display end, and the 3D image may be constructed by the display end. The display end is a device with 3D image construction capability, such as an interactive light field display. Taking a moment in the video stream as an example, after the viewing perspective of the user viewing at the moment being determined in the 3D video model based on the interaction parameter, and corresponding target light field rendering views being generated, these views may be issued to the light field display. After the light field display processing the received views, the corresponding 3D image of the perspective may be constructed.

Because the depth video streams contain a plurality of image frames, and the generated dynamic 3D video model corresponds to the plurality of image frames one by one, the 3D image constructed in real time based on the target light field rendering views corresponding to the plurality of image frames is also dynamic. The dynamic 3D image displays the three-dimensional real-time scene captured by at least two cameras aiming at the target scene.

In the scheme of this embodiment, the 3D video model is stored throughout the entire process at the computing end, and only the two-dimensional video stream (the target light field rendering view) obtained after processing is issued by the computing end. Therefore, the real-time holographic communication scheme based on the present embodiment does not have high requirements for the transmission rate of the network transmission channel. In practical applications, even if 4G network is used for data transmission, the network delay can be kept below 100 ms.

The scheme of the embodiments of the present disclosure is applicable to various application scenarios. For example, in a video conference scenario, the holographic 3D image of other users may be displayed on the display end of one user based on the scheme of the present disclosure. Correspondingly, the holographic 3D image of any user other than oneself may also be displayed on the display end of other users as needed. At least two cameras may be deployed in the environment where each user is located to capture the color image and the depth image of the user. Upon generating the depth video stream of each user based on these information, these video streams may be uploaded to the cloud server as a computing end in the form of pushing streams. The cloud server may determine the 3D video model corresponding to each user based on each depth video stream. The cloud server obtains the corresponding interaction parameter from the display end of each user. The interaction parameter is used to determine which perspective of the target user (such as the user who is speaking) corresponding to the image the user viewing the 3D image may see, so that the cloud servicer generates the target light field rendering views corresponding to the perspective based on the 3D video model. The target light field rendering views are used to construct a specific 3D image in the display end. Correspondingly, these images display pictures that are taken from a specific perspective in the depth video streams.

At last, upon the cloud server determining the target light field rendering views, these views may be issued to the corresponding display end, and the display end may construct a 3D image corresponding to the depth video streams based on the plurality of views. At this time, other users may see the holographic image of the target user (the user who is speaking) on their own display end during the video conference. For the target user in the example, the holographic image of other users may also be seen on their own display end based on the above scheme, thereby enhancing the interaction and experience between a plurality of users during the video conference process. The scheme of the embodiments of the present disclosure may not only be applied to the video conference scenario in the above example, but also to holographic image-based communication, LIVE, teaching scenarios, and holographic display scenarios for a specific object, a commodity, a project, and a building.

The technical solution of the present embodiment only needs to receive depth video streams of at least two camera perspectives of the same scene to determine the 3D video model corresponding to the depth video streams of the at least two camera perspectives; the light field rendering is performed on the 3D video model based on the obtained interaction parameter, and the plurality of target light field rendering views may be obtained; the plurality of target light field rendering views are sent to a display end to construct a 3D image corresponding to the depth video streams at the display end, which not only realizes the real-time holographic communication with fewer cameras, but also performs light field rendering processing on the 3D video model, avoiding direct compression and transmission of the 3D video, reducing the requirements of the real-time holographic communication on a network transmission channel, and enhancing the universality of the scheme, while ensuring the transmission quality of the depth video stream-related views.

Embodiment Two

Figure 2:
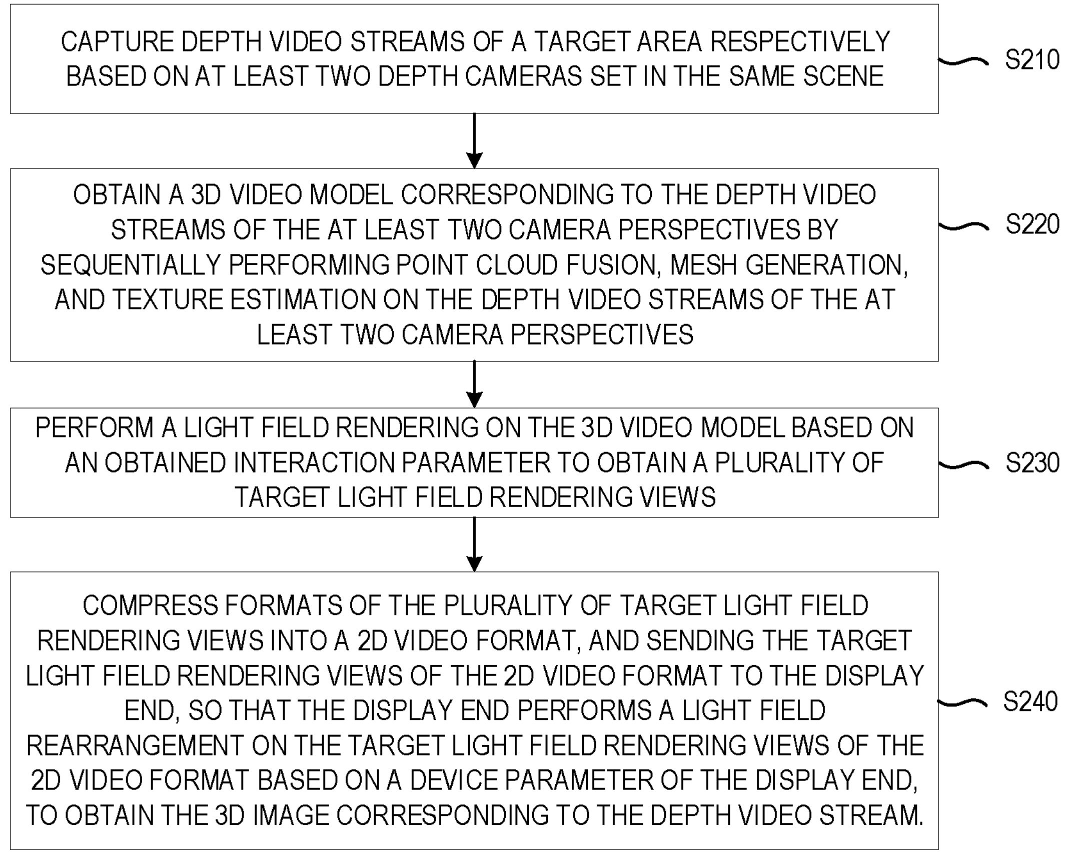
FIG. 2 is a flowchart of a method of reconstructing a 3D image provided in a second embodiment of the present disclosure.

FIG. 2 is a schematic flowchart of a method of reconstructing 3D image provided in Embodiment two of the present disclosure. Based on the foregoing embodiments, the depth video streams are collected based on at least two depth cameras, reducing the hardware cost of obtaining the scene information. Point cloud fusion is performed on the depth video streams, mesh generation, and texture estimation processing sequentially, to make the generated 3D video model more refined. Different interaction parameters are selected for different display ends to generate the target light field rendering views, so that the specific image required by the display end can be generated by the computing end. Light field rearrangement is performed on the target light field rendering views, thereby generating the real-time dynamic 3D image. The specific implementation may refer to the technical solution of the present embodiment, and the same or corresponding technical terms as the above embodiments are not repeated here.

As shown in FIG. 2, the method includes:

S210. capturing depth video streams of a target area respectively based on at least two depth cameras set in the same scene.

In this embodiment, the at least two cameras set in the same scene may be RGB-Depth map (RGBD) cameras, where one RGBD camera may be a combination of a color camera and a camera that can obtain depth images. The camera that can obtain depth images include a structured light camera and a Time of Fight (ToF) camera. After shooting the target area with the RGBD camera, the color (RGB) image and the depth (Distance) image may be output, and these images may be integrated as video frames to obtain the depth video streams.

In this embodiment, when using the depth camera to shoot the target area for capturing the depth video stream, there are various arrangements for the camera, such as at least two depth cameras arranged horizontally relative to the target user in the target area. The following is an example description of this arrangement in combination with FIG. 3.

Figure 3:
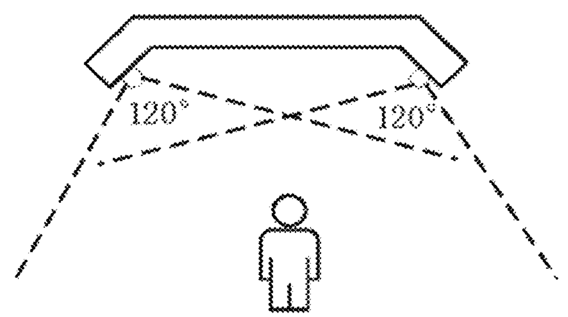
FIG. 3 is a camera arrangement manner applied to a capture end provided in the second embodiment of the present disclosure.

Referring to FIG. 3, two circles in FIG. 3 are used as two depth cameras. From a bird's-eye perspective, both cameras are aimed at the user in the figure for shooting, and the angle range covered by camera lens is 120°. At the same time, both cameras and the upper body of the target user are kept in the same horizontal plane. This arrangement may keep the target user in the field of view of the cameras at all times, and the two depth cameras may also capture color images and depth images of the plurality of perspectives (i.e., all perspectives except the perspective right behind the user and the perspective diagonally behind the user) of the user in real time, thereby generating the depth video streams containing images of the plurality of perspectives of the user.

Figure 4:
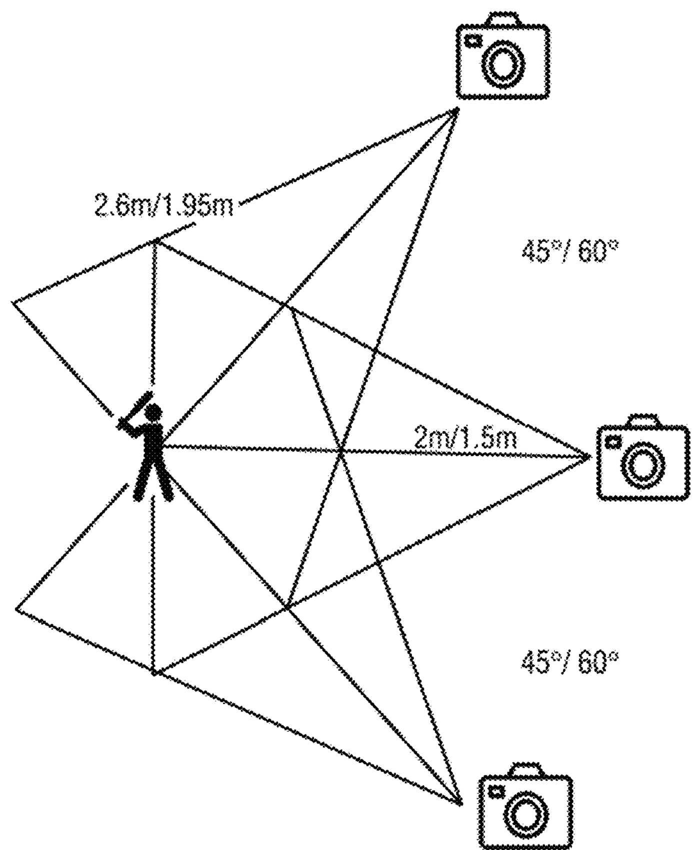
FIG. 4 is a further camera arrangement manner applied to the capture end provided in the second embodiment of the present disclosure.

In practical applications, the plurality of depth cameras may further be used to shoot the target user. As shown in FIG. 4, three depth cameras are deployed in the same horizontal plane. These cameras do not need to be on the same baseline. The shooting angles of adjacent cameras may be separated by 450 or 60°. At the same time, in order to ensure the imaging effect, the distance between the depth camera and the target user may be selected according to actual needs (as shown in FIG. 4, a distance of 2m or 2.6m between the camera and the user is kept).

As the number of deployed depth cameras continues to increase, the more available arrangement options, the more perspective images captured for the target user, thereby obtaining the depth video streams of the plurality of perspectives.

S220. Obtain the 3D video model corresponding to the depth video streams of the at least two camera perspectives by sequentially performing point cloud fusion, mesh generation, and texture estimation on the depth video streams of the at least two camera perspectives.

In the present embodiment, upon the computing end receiving the depth video streams of the at least two camera perspectives, point cloud fusion, mesh generation and texture estimation processes need to be performed on the data in the video streams in order to obtain the corresponding 3D video model. The three processing steps are described separately in the following.

At any time during the real-time data transmission process, a plurality of frames of pictures corresponding to the moment may be determined from the plurality of depth video streams, and each frame of the pictures contains color information and depth information of the target area.

Based on this, the computing end may construct corresponding Point Cloud Data (PCD) for each moment based on point cloud computing technology. The Point Cloud Data is usually used in Reverse Engineering, which is a type of data recorded in the form of points. These points may be coordinates in the three-dimensional space, as well as information such as color or light intensity. In practical applications, the Point Cloud Data generally includes point coordinate accuracy, spatial resolution, and a surface normal vector, etc., which are generally stored in PCD format. In this format, the Point Cloud Data has strong operability and the speed of point cloud registration and fusion in the subsequent process can be improved.

In the plurality of depth video streams at any time, for the plurality of frames of images shot at different angles, there are certain common parts between the plurality of frames. Therefore, before the computing end obtains the Point Cloud Data based on the depth video streams and performs point cloud fusion based on these data, point cloud registration needs to be performed first. For the registration of images containing depth information, the common part of the scene may be used as the baseline, and the plurality of frames of images obtained at different time, angles, and illuminance may be superimposed and matched into a unified coordinate system. The corresponding translation vector and rotation matrix are calculated to eliminate redundant information. The registration of three-dimensional depth information is divided into three types of methods: rough registration, fine registration, and global registration according to different image input conditions and reconstruction output requirements. The registration method may be selected according to actual needs, which will not be repeated here in the embodiments of the present disclosure.

In this embodiment, the depth information after registration is still scattered and disordered Point Cloud Data in space, which can only show part of the information of the target area. At this time, the Point Cloud Data needs to be fused. There are various processing methods. For example, a corresponding point cloud fusion program may be written based on a programming language, and the cloud point data may be processed by executing the program to generate a corresponding 3D model in the 3D mapping software. An origin may further be set, and a volume mesh may be constructed in the three-dimensional space. These meshes may divide the space into many small cubes as voxels, and implicitly simulate the surface by assigning a Signed Distance Field (SDF) to all voxels. At the same time, to solve the problem of voxels occupying a large amount of space, the Truncated Signed Distance Field (TSDF) algorithm may be used. This algorithm uses the least squares method to optimize the processing process and introduces weight values during the point cloud fusion, therefore it has noise reduction function for the Point Cloud Data. The processing process is accelerated based on the Voxel Hashing method, and in practical applications, it achieves 7 times acceleration compared to traditional algorithms, ensuring the demand for real-time data transmission.

For depth video streams, an unoptimized 3D video model may be obtained only through point cloud fusion processing. Therefore, to make the 3D video model more refined, mesh generation processing and texture estimation processing may be further performed on the real-time generated model. The mesh generation is to divide a specific area into many small sub-regions, so that the computing end can process the content of each sub-region specifically. Based on the connection relationship between the meshes, the obtained sub-regions may be structured meshes and unstructured meshes. The texture estimation belongs to the estimation of an object material parameter of an object in the model. For example, the feature of the object in each frame of the video streams may be extracted and analyzed first, and then the material parameter of each object surface may be obtained, based on which the texture estimation of the model corresponding to the target area is implemented.

S230. Perform a light field rendering on the 3D video model based on an obtained interaction parameter to obtain a plurality of target light field rendering views.

In this embodiment, for different display ends, there are differences in the interaction parameters based on which the target light field rendering views are generated.

If the display end is a naked eye 3D display device, the obtained interaction parameter is the device parameter of the 3D display device; the light field rendering is performed on the 3D video model based on the device display parameter, to obtain the plurality of target light field rendering views.

The naked eye 3D display device may be a naked eye 3D display, which utilizes the parallax between human eyes to generate realistic stereoscopic images with space and depth without any auxiliary devices. When the naked eye 3D display device is used as the display end, the device display parameter may be used as the interaction parameter, such as a 3D visual angle.

The visual angle of different devices is not the same. For example, some devices have a visual angle of 70°, which means that a 3D image with a maximum field of view of 70° of the target area may be displayed, while other devices may display a full-angle range. After the plurality of depth cameras have fully captured the image information of the target area, such device may display the corresponding 3D image in a 360° surrounding manner.

In this embodiment, after the device display parameter of the naked eye 3D display device is used as the interaction parameter, the light field rendering may be performed on the 3D video model to obtain the corresponding target light field rendering views.

If the display end is a non-naked eye 3D display device, the obtained interaction parameters are the device parameter of the non-naked eye 3D display device and a user head parameter corresponding to the display end; the light field rendering is performed on the 3D video model based on the device display parameter and the head parameter, to obtain the plurality of the target light field rendering views.

In this embodiment, if the display end is a non-naked eye 3D display device, the user needs to wear a specific auxiliary device, such as a Virtual Reality (VR) headset, which includes an external headset, an integrated headset, a mobile end headset, etc., when viewing 3D images. At this time, the interaction parameters that determine the target light field rendering views not only include the device parameter of the display end, but also the head parameter of the user viewing the 3D image. For example, the visual angle of the display end device is 70°, and the head parameter obtained through the VR headset of the user indicates that the user only wants to view the 3D image on the left side of the target area, based on which, the computing end may generate a plurality of 2D images biased to the left side within the range of perspectives of 70° of the target area as the target light field rendering views based on the 3D video model.

Regardless of whether the interaction parameters include only the device parameter or both the device parameter and the user head information, it can determine and reflect the 3D image from which perspective the display end is displaying. Therefore, in the process of generating views, for the 3D video model generated by the depth video streams, only the part corresponding to the content currently displayed by the display end needs to be selected from the model to construct the target light field rendering views, and these target light field rendering views reflect the image information of the specific perspective of the target area. When the interaction parameter of the display end does not require the full display of the 3D image of the target area, even if the plurality of depth cameras have captured all the image information of the target area, there is no need to construct the light field rendering views of the entire perspectives of the area.

The transmission of the depth video streams, the creation of the 3D video model, and the generation of the target light field rendering views are all real-time and dynamic. Therefore, when the interaction parameter changes due to changes in the display end device or the user head parameter, the generated target light field rendering views will also undergo adaptive changes, thereby obtaining the target light field rendering views corresponding to the new interaction parameter. For example, when the user head moves horizontally, the generated target light field rendering views will also change accordingly.

S240. Compress formats of the plurality of target light field rendering views into a 2D video format, and send the target light field rendering views of the 2D video format to the display end, so that the display end performs a light field rearrangement on the target light field rendering views of the 2D video format based on a device parameter of the display end, to obtain the 3D image corresponding to the depth video streams.

In this embodiment, after the computing end obtaining the target light field rendering views, in order to support data transmission, the format of the plurality of images may be encoded and compressed into the 2D video format based on video compression standards such as H.264, and these data may be issued to the display end in a form of 2D video streams.

After the display end receiving the 2D video streams, the light field rearrangement may be performed based on the device parameter of the display end to obtain the 3D image corresponding to the depth video streams. The light field rearrangement process is to decode a plurality of frames of images from the video stream, combine the plurality of images in a specific order to form the image that needs to be displayed on the light field display, and rearrange the pixels or sub-pixels in the combined image through a spectrometer on the light field display panel. Finally, the combined image presents a holographic 3D effect using the visual differences of the human eyes. Corresponding to the real-time and dynamic depth video streams, the 3D image displayed at the display end is also dynamic, and the device parameter based on the display end may at least reflect the real-time scene of a specific perspective of the target area.

Figure 5:
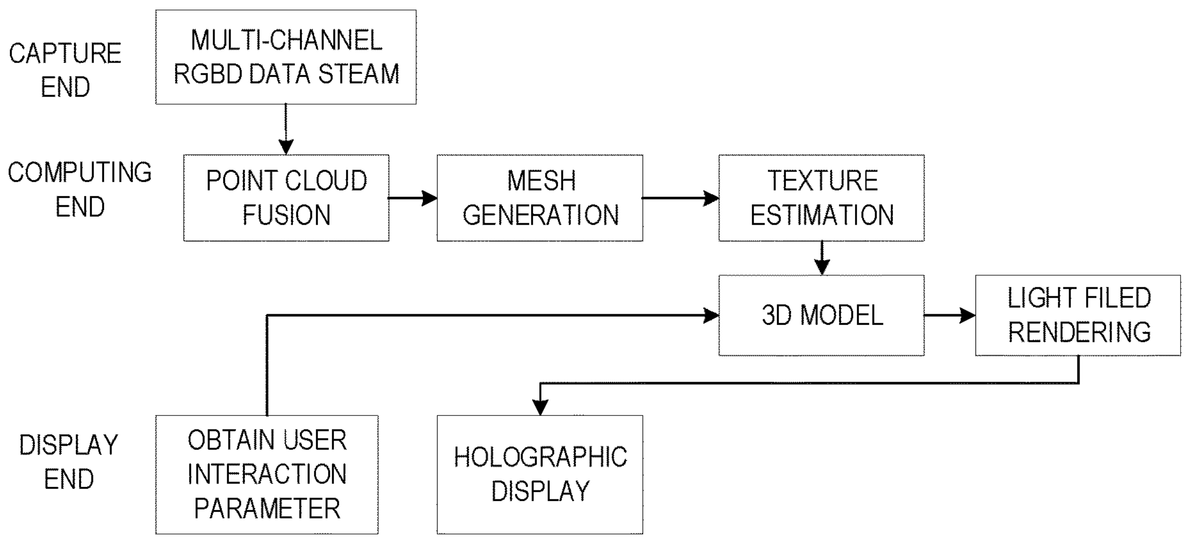
FIG. 5 is a flowchart of a method of reconstructing a 3D image provided in the second embodiment of the present disclosure.

The following is an example description of the embodiments of the present disclosure in combination with FIG. 5. Referring to FIG. 5, firstly, the capture end may use a multi-channel RGBD camera to capture the scene of the target area, obtain multiple frames of color images and depth images, and send these images to the computing end in the form of depth video stream. After receiving the depth video streams, the computing end obtains a preliminary unoptimized model by point cloud fusion processing of multiple frames of images, and then optimizes the 3D video model through network generation and texture estimation processing to obtain the final 3D video model. The user interaction parameter is obtained from the display end, and the target light field rendering views are generated based on the interaction parameter and the 3D video model. These views represent the images that the display end needs to display which correspond to the scene of a specific perspective of the target area. After determining the target light field views, these views are encoded and compressed, and sent to the display end (such as the light field display) in the form of the 2D video stream. The display end then rearranges the light field of the images in the 2D video stream based on the user interaction parameter and obtains the 3D image corresponding to the depth video streams. The holographic 3D effect may be performed using the visual differences of the human eyes based on the light field display.

The technical solution of this embodiment reduces the hardware cost of obtaining scene information based on at least two depth cameras for capturing depth video streams; point cloud fusion, mesh generation, and texture estimation processes are sequentially performed on the depth video streams to make the generated 3D video model more precise; different interaction parameters are selected for different display ends to generate the target light field rendering views, supporting the computing end to generate a specific image required by the display end; the light field rearrangement is performed on the target light field rendering view, thereby generating the real-time dynamic 3D image.

Embodiment Three

Figure 6:
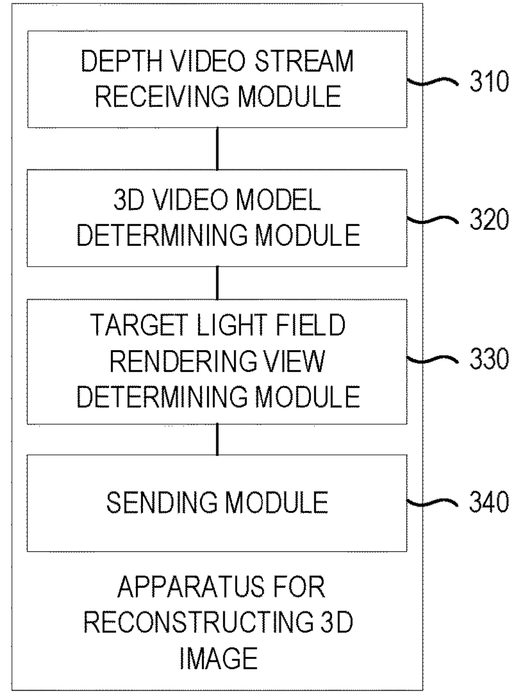
FIG. 6 is a structural diagram of an apparatus for reconstructing a 3D image provided in a third embodiment of the present disclosure.

FIG. 6 is a structural diagram of an apparatus for reconstructing a 3D image provided in the third embodiment of the present disclosure, which may perform any method of reconstructing 3D image provided in any embodiment of the present disclosure and has corresponding functional modules and effects for executing the method. As shown in FIG. 6, the apparatus includes: a depth video stream receiving module 310, a 3D video model determining module 320, a target light field rendering view determining module 330, and a sending module 340.

The depth video stream receiving module 310 is configured to receive depth video streams of at least two camera perspectives of a same scene.

The 3D video model determination module 320 is configured to determine a 3D video model corresponding to the depth video stream of the at least two camera perspectives.

The target light field rendering view determination module 330 is configured to perform a light field rendering on the 3D video model based on an obtained interaction parameter to obtain a plurality of target light field rendering views.

The sending module 340 is configured to send the plurality of target light field rendering views to a display end to construct a 3D image corresponding to the depth video streams at the display end.

Based on the above technical solution, the depth video stream receiving module 310 is configured to capture depth video streams of a target area respectively based on at least two depth cameras set in the same scene.

Based on the above technical solution, the at least two depth cameras are arranged horizontally relative to a target user in the target area.

Based on the above technical solution, the 3D video model determining module 320 is configured to obtain a 3D video model corresponding to the depth video streams of the at least two camera perspectives by sequentially performing point cloud fusion, mesh generation, and texture estimation on the depth video streams of the at least two camera perspectives.

Based on the above technical solution, the target light field rendering view determining module 330 includes a naked-eye 3D display device light field rendering view determining module and a non-naked eye 3D display device light field rendering view determining module.

The naked-eye 3D display device light field rendering view determining module is configured to, in case where the display end is a naked-eye 3D display device, the obtained interaction parameter is a device parameter of the naked-eye 3D display device; perform the light field rendering on the 3D video model based on the device display parameter to obtain the plurality of target light field rendering views.

The non-naked eye 3D display device light field rendering view determining module is configured to, in case where the display end is a non-naked eye 3D display device, the obtained interaction parameter is a device parameter of the non-naked eye 3D display device and a user head parameter corresponding to the display end; perform the light field rendering on the 3D video model based on the device display parameter and the head parameter to obtain the plurality of target light field rendering views.

The sending module 340 is configured to compress formats of the plurality of target light field rendering views into a 2D video format, and send the target light field rendering views of the 2D video format to the display end, so that the display end performs a light field rearrangement on the target light field rendering views of the 2D video format based on a device parameter of the display end, to obtain the 3D image corresponding to the depth video streams.

The technical solution provided in this embodiment only needs to receive depth video streams from at least two camera perspectives of the same scene to determine the 3D video model corresponding to the depth video streams of the at least two camera perspectives; the plurality of target light field rendering views may be obtained by the light field rendering performed on the 3D video model based on the obtained interaction parameter; the plurality of target light field rendering views are sent to the display end to construct a 3D image corresponding to the depth video streams at the display end, which not only realizes real-time holographic communication with fewer cameras, but also performs light field rendering processing on the 3D video model, avoiding direct compression and transmission of the 3D video. While ensuring the transmission quality of depth video stream-related views, it reduces the requirements of real-time holographic communication on network transmission channels and enhances the universality of the scheme.

The apparatus for reconstructing the 3D image provided in the present disclosure may execute the method of reconstructing a 3D image provided in any embodiment of the present disclosure and has the corresponding functional modules and effects of the execution method.

The plurality of units and modules included in the above apparatus are only divided according to functional logic, but are not limited to the above division, as long as the corresponding functions can be realized; in addition, the names of the plurality of functional units are only for the convenience of distinguishing each other and are not used to limit the protection scope of the embodiments of the present disclosure.

Embodiment Four

Figure 7:
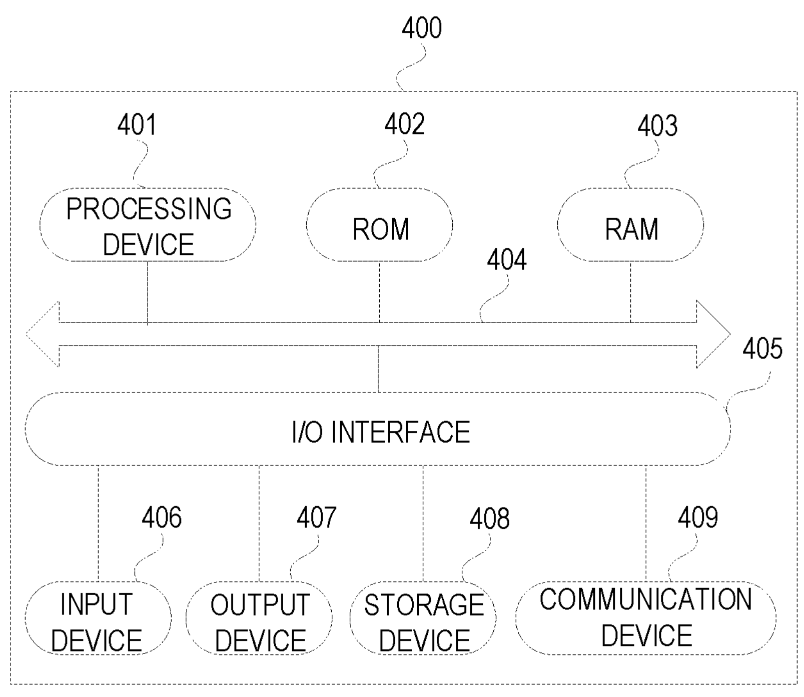
FIG. 7 is a schematic diagram of the structure of an electronic device provided in a fourth embodiment of the present disclosure.

FIG. 7 is a schematic diagram of the structure of an electronic device provided in Embodiment four of the present disclosure. Referring to FIG. 7 below, it shows a schematic diagram of the structure of an electronic device (such as a terminal device or a server in FIG. 7) 400 suitable for implementing the present disclosure. The terminal device 400 in the present disclosure may include but is not limited to a mobile terminal such as a mobile phone, a laptop, a digital broadcast receiver, a personal digital assistant (PDA), a tablet computer (Portable Android Device, PAD), a Portable Media Player, PMP, a vehicle-mounted terminal (such as a vehicle navigation terminal), and a fixed terminal such as a digital television (TV), a desktop computer, etc. The electronic device 400 shown in FIG. 7 is only an example and should not bring any restrictions on the functionality and scope of use of the present disclosure.

As shown in FIG. 7, the electronic device 400 may include a processing device (for example, a Central Processing Unit, a Graphics Processing Unit, and the like) 401, which may perform various appropriate actions and processes based on a program stored in a Read-Only Memory (ROM) 402 or a program loaded from a storage device 408 into a Random Access Memory (RAM) 403. In the RAM 403, various programs and data required for the operation of the electronic device 400 are also stored. The processing device 401, the ROM 402, and the RAM 403 are connected to each other via a bus 404. An Input/Output (I/O) interface 405 is also connected to the bus 404.

Typically, the following devices may be connected to the I/O interface 405: an input device 406 including, for example, a touch screen, a touchpad, a keyboard, a mouse, a camera, a microphone, an accelerometer, a gyroscope, and/or the like; an output device 407 including, for example, a Liquid Crystal Display (LCD), a speaker, a vibrator, and/or the like; the storage device 408 including, for example, a magnetic tape, a hard disk, and/or the like; and a communication device 409. The communication device 409 may allow the electronic device 400 to communicate wirelessly or wired with other devices to exchange data. Although FIG. 7 shows the electronic device 400 with multiple devices, it is not required to implement or have all of the shown devices.

Alternatively, more or fewer devices may be implemented or provided.

According to the embodiments of the present disclosure, the processes described above with reference to the flowchart may be implemented as a computer software program. For example, the embodiments of the present disclosure include a computer program product that includes a computer program carried on a non-transitory computer-readable medium, and the computer program contains program code for performing the method shown in the flowchart. In such embodiments, the computer program may be downloaded and installed from the network through the communication device 409, or installed from the storage device 408, or installed from the ROM 402. When the computer program is executed by the processing device 401, the above functions defined in the method of the embodiments of the present disclosure are performed.

The names of the messages or information exchanged between multiple devices in this implementation of the present disclosure are only for illustrative purposes and are not intended to limit the scope of these messages or information.

The electronic device provided in the embodiments of the present disclosure belongs to the same concept as the method of reconstructing a 3D image provided in the above embodiments. Technical details that are not described in detail in this embodiment can be found in the above embodiments, and this embodiment has the same effect as the above embodiments.

Embodiment Five

The embodiments of the present disclosure provide a computer storage medium on which a computer program is stored, the computer program realizes the method of reconstructing a 3D image provided in the above embodiments when executed by a processor.

The computer-readable storage medium described above may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. Examples of computer-readable storage medium may include but are not limited to an electrical connection with one or more wires, a portable computer disk, a hard disk, an RAM, an ROM, an Erasable Programmable Read-Only Memory (EPROM or flash memory), an optical fiber, a portable Compact Disc Read-Only Memory (CD-ROM), an optical storage device, a magnetic storage device, or any suitable combination thereof. In the present disclosure, the computer-readable storage medium may be any tangible medium containing or storing a program that can be used by an instruction execution system, apparatus, or device, or in combination therewith. In the present disclosure, a computer-readable signal medium may include a data signal propagated in baseband or as part of a carrier wave, which carries computer-readable program code. Such a propagated data signal may be in many forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit the program used by or used in combination with the instruction execution system, apparatus, or device. The program code contained on the computer-readable medium may be transmitted by any suitable medium, including but not limited to: a wire, an optical cable, Radio Frequency (RF), and/or the like, or any suitable combination thereof.

In some implementations, a client and a server may communicate using any currently known or future developed network protocol such as HyperText Transfer Protocol (HTTP), and may interconnect with any form or medium of digital data communication (for example, a communication network). Examples of the communication network include a Local Area Network (LAN), a Wide Area Network (WAN), the Internet network (for example, the Internet), and an end-to-end network (for example, an ad hoc end-to-end network), as well as any currently known or future developed networks.

The computer-readable medium may be included in the electronic device described above; or it may exist alone without being assembled into the electronic device.

The computer-readable medium carries one or more programs, and when the one or more programs are executed by the electronic device, causes the electronic device: to receive depth video streams of at least two camera perspectives of a same scene; to determine a 3D video model corresponding to the depth video streams of the at least two camera perspectives; to perform a light field rendering on the 3D video model based on an obtained interaction parameter to obtain a plurality of target light field rendering views; and to send the plurality of target light field rendering views to a display end to construct a 3D image corresponding to the depth video streams at the display end.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations or can be implemented by the combination of dedicated hardware and computer instructions.

The units described in the embodiments of the present disclosure may be implemented by software or hardware. The name of the unit does not constitute a limitation on the unit itself in one case, for example, the depth video stream receiving module may further be described as "a module that receives depth video streams from at least two camera perspectives of the same scene."

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, [Example one] provides a method of reconstructing a 3D image, and the method comprises:

receiving depth video streams of at least two camera perspectives of a same scene;

determining a 3D video model corresponding to the depth video streams of the at least two camera perspectives;

performing a light field rendering on the 3D video model based on an obtained interaction parameter to obtain a plurality of target light field rendering views;

sending the plurality of target light field rendering views to a display end to construct a 3D image corresponding to the depth video streams at the display end.

According to one or more embodiments of the present disclosure, [Example two] provides a method of reconstructing a 3D image, and the method further comprises:

capturing depth video streams of a target area respectively based on at least two depth cameras set in the same scene.

According to one or more embodiments of the present disclosure, [Example three] provides a method of reconstructing a 3D image, and the method further comprises:

the at least two depth cameras are arranged horizontally relative to a target user in the target area.

According to one or more embodiments of the present disclosure, [Example four] provides a method of reconstructing a 3D image, and the method further comprises:

obtaining a 3D video model corresponding to the depth video streams of the at least two camera perspectives by sequentially performing point cloud fusion, mesh generation, and texture estimation on the depth video streams of the at least two camera perspectives.

According to one or more embodiments of the present disclosure, [Example five] provides a method of reconstructing a 3D image, and the method further comprises:

in case where the display end is a naked-eye 3D display device, the obtained interaction parameter is a device parameter of the naked-eye 3D display device;

performing the light field rendering on the 3D video model based on the device display parameter to obtain the plurality of target light field rendering views.

According to one or more embodiments of the present disclosure, [Example six] provides a method of reconstructing a 3D image, and the method further comprises:

in case where the display end is a non-naked eye 3D display device, the obtained interaction parameter is a device parameter of the non-naked eye 3D display device and a user head parameter corresponding to the display end;

performing the light field rendering on the 3D video model based on the device display parameter and the head parameter to obtain the plurality of target light field rendering views.

According to one or more embodiments of the present disclosure, [Example seven] provides a method of reconstructing a 3D image, and the method further comprises:

compressing formats of the plurality of target light field rendering views into a 2D video format, and sending the target light field rendering views of the 2D video format to the display end, so that the display end performs a light field rearrangement on the target light field rendering views of the 2D video format based on a device parameter of the display end, to obtain the 3D image corresponding to the depth video streams.

According to one or more embodiments of the present disclosure, [Example eight] provides an apparatus for reconstructing a 3D image, and the apparatus further comprises:

a depth video stream receiving module configured to receive depth video streams of at least two camera perspectives of a same scene;

a 3D video model determining module configured to determine a 3D video model corresponding to the depth video streams of the at least two camera perspectives;

a target light field rendering view determining module configured to perform a light field rendering on the 3D video model based on an obtained interaction parameter to obtain a plurality of target light field rendering views;

a sending module configured to send the plurality of target light field rendering views to a display end to construct a 3D image corresponding to the depth video streams at the display end.

In addition, although various operations are depicted in a specific order, it should not be understood as requiring such operations to be performed in the specific order shown or in a sequential order. Under given conditions, multi-task processing and parallel processing may be advantageous. Similarly, although details of several specific implementations are included in the foregoing discussion, these details should not be construed as a limitation to the scope of the present disclosure. Some features described in the context of individual embodiments may also be implemented in a single embodiment in combination. On the contrary, various features described in the context of a single embodiment may also be implemented in a plurality of embodiments separately or in any suitable sub-combination.

What is claimed is:

1. A method of reconstructing a three-dimensional, 3D, image, comprising:

receiving depth video streams of at least two camera perspectives of a same scene;

determining a 3D video model corresponding to the depth video streams of the at least two camera perspectives;

performing a light field rendering on the 3D video model based on an obtained interaction parameter corresponding to a display end, to obtain a plurality of target light field rendering views, wherein the plurality of target light field rendering views is represented as a two-dimensional video stream obtained after processing; and sending the plurality of target light field rendering views to the display end to construct a 3D image corresponding to the depth video streams at the display end.

2. The method of claim 1, wherein the receiving depth video streams of at least two camera perspectives in a same scene comprises:

capturing depth video streams of a target area respectively based on at least two depth cameras set in the same scene.

3. The method of claim 2, wherein the at least two depth cameras are arranged horizontally relative to a target user in the target area.

4. The method of claim 1, wherein the determining a 3D video model corresponding to the depth video streams of the at least two camera perspectives comprises:

obtaining a 3D video model corresponding to the depth video streams of the at least two camera perspectives by sequentially performing point cloud fusion, mesh generation, and texture estimation on the depth video streams of the at least two camera perspectives.

5. The method of claim 1, wherein the performing a light field rendering on the 3D video model based on an obtained interaction parameter, to obtain a plurality of target light field rendering views comprises:

in case where the display end is a naked-eye 3D display device, the obtained interaction parameter is a device parameter of the naked-eye 3D display device;

performing the light field rendering on the 3D video model based on the device display parameter to obtain the plurality of target light field rendering views.

6. The method of claim 1, wherein the performing a light field rendering on the 3D video model based on an obtained interaction parameter to obtain a plurality of target light field rendering views comprises:

in case where the display end is a non-naked eye 3D display device, the obtained interaction parameter is a device parameter of the non-naked eye 3D display device and a user head parameter corresponding to the display end;

performing the light field rendering on the 3D video model based on the device display parameter and the head parameter to obtain the plurality of target light field rendering views.

7. The method of claim 1, wherein the sending the plurality of target light field rendering views to a display end, to construct a 3D image corresponding to the depth video streams at the display end comprises:

compressing formats of the plurality of target light field rendering views into a 2D video format, and sending the target light field rendering views of the 2D video format to the display end, so that the display end performs a light field rearrangement on the target light field rendering views of the 2D video format based on a device parameter of the display end, to obtain the 3D image corresponding to the depth video streams.

8. An electronic device, comprising:

at least one processor;

a storage device configured to store at least one program;

the at least one program, when executed by the at least one processor, causes the at least one processor to perform acts comprising:

receiving depth video streams of at least two camera perspectives of a same scene;

determining a 3D video model corresponding to the depth video streams of the at least two camera perspectives;

performing a light field rendering on the 3D video model based on an obtained interaction parameter corresponding to a display end, to obtain a plurality of target light field rendering views, wherein the plurality of target light field rendering views is represented as a two-dimensional video stream obtained after processing; and sending the plurality of target light field rendering views to the display end to construct a 3D image corresponding to the depth video streams at the display end.

9. The electronic device of claim 8, wherein the receiving depth video streams of at least two camera perspectives in a same scene comprises:

capturing depth video streams of a target area respectively based on at least two depth cameras set in the same scene.

10. The electronic device of claim 9, wherein the at least two depth cameras are arranged horizontally relative to a target user in the target area.

11. The electronic device of claim 8, wherein the determining a 3D video model corresponding to the depth video streams of the at least two camera perspectives comprises:

obtaining a 3D video model corresponding to the depth video streams of the at least two camera perspectives by sequentially performing point cloud fusion, mesh generation, and texture estimation on the depth video streams of the at least two camera perspectives.

12. The electronic device of claim 8, wherein the performing a light field rendering on the 3D video model based on an obtained interaction parameter, to obtain a plurality of target light field rendering views comprises:

in case where the display end is a naked-eye 3D display device, the obtained interaction parameter is a device parameter of the naked-eye 3D display device;

performing the light field rendering on the 3D video model based on the device display parameter to obtain the plurality of target light field rendering views.

13. The electronic device of claim 8, wherein the performing a light field rendering on the 3D video model based on an obtained interaction parameter to obtain a plurality of target light field rendering views comprises:

in case where the display end is a non-naked eye 3D display device, the obtained interaction parameter is a device parameter of the non-naked eye 3D display device and a user head parameter corresponding to the display end;

performing the light field rendering on the 3D video model based on the device display parameter and the head parameter to obtain the plurality of target light field rendering views.

14. The electronic device of claim 8, wherein the sending the plurality of target light field rendering views to a display end, to construct a 3D image corresponding to the depth video streams at the display end comprises:

compressing formats of the plurality of target light field rendering views into a 2D video format, and sending the target light field rendering views of the 2D video format to the display end, so that the display end performs a light field rearrangement on the target light field rendering views of the 2D video format based on a device parameter of the display end, to obtain the 3D image corresponding to the depth video streams.

15. A non-transitory storage medium containing computer-executable instructions, the computer-executable instructions, when executed by a computer processor, perform acts comprising:

receiving depth video streams of at least two camera perspectives of a same scene;

determining a 3D video model corresponding to the depth video streams of the at least two camera perspectives;

performing a light field rendering on the 3D video model based on an obtained interaction parameter corresponding to a display end, to obtain a plurality of target light field rendering views, wherein the plurality of target light field rendering views is represented as a two-dimensional video stream obtained after processing; and sending the plurality of target light field rendering views to the display end to construct a 3D image corresponding to the depth video streams at the display end.

16. The storage medium of claim 15, wherein the receiving depth video streams of at least two camera perspectives in a same scene comprises:

capturing depth video streams of a target area respectively based on at least two depth cameras set in the same scene.

17. The storage medium of claim 16, wherein the at least two depth cameras are arranged horizontally relative to a target user in the target area.

18. The storage medium of claim 15, wherein the determining a 3D video model corresponding to the depth video streams of the at least two camera perspectives comprises:

obtaining a 3D video model corresponding to the depth video streams of the at least two camera perspectives by sequentially performing point cloud fusion, mesh generation, and texture estimation on the depth video streams of the at least two camera perspectives.

19. The storage medium of claim 15, wherein the performing a light field rendering on the 3D video model based on an obtained interaction parameter, to obtain a plurality of target light field rendering views comprises:

in case where the display end is a naked-eye 3D display device, the obtained interaction parameter is a device parameter of the naked-eye 3D display device;

performing the light field rendering on the 3D video model based on the device display parameter to obtain the plurality of target light field rendering views.

20. The storage medium of claim 15, wherein the performing a light field rendering on the 3D video model based on an obtained interaction parameter to obtain a plurality of target light field rendering views comprises:

in case where the display end is a non-naked eye 3D display device, the obtained interaction parameter is a device parameter of the non-naked eye 3D display device and a user head parameter corresponding to the display end;

performing the light field rendering on the 3D video model based on the device display parameter and the head parameter to obtain the plurality of target light field rendering views.

* * * * *